(12) United States Patent
Venkatesan et al.

(10) Patent No.: US 12,277,192 B1
(45) Date of Patent: Apr. 15, 2025

(54) ZERO-SHOT TRANSFER OF DOMAIN-ADAPTED BASE NETWORKS

(71) Applicant: Amazon Technologies, Inc., Seattle, WA (US)

(72) Inventors: Ragav Venkatesan, Seattle, WA (US); Xiong Zhou, Bothell, WA (US); Gurumurthy Swaminathan, Redmond, WA (US); Fedor Zhdanov, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1127 days.

(21) Appl. No.: 16/560,814

(22) Filed: Sep. 4, 2019

(51) Int. Cl.
  *G06F 18/214* (2023.01)
  *G06N 3/08* (2023.01)
  *G06N 5/04* (2023.01)
  *G06N 20/00* (2019.01)

(52) U.S. Cl.
  CPC ............ *G06F 18/214* (2023.01); *G06N 3/08* (2013.01); *G06N 5/04* (2013.01); *G06N 20/00* (2019.01)

(58) Field of Classification Search
  CPC ............ G06N 3/08; G06N 5/04; G06N 20/00; G06K 9/6256
  See application file for complete search history.

(56) References Cited

U.S. PATENT DOCUMENTS

| | | | |
|---|---|---|---|
| 10,176,388 B1 * | 1/2019 | Ghafarianzadeh | G06V 20/20 |
| 10,783,381 B2 * | 9/2020 | Yu | G06V 10/7753 |
| 2018/0005070 A1 * | 1/2018 | Lin | G06N 3/045 |
| 2018/0225808 A1 * | 8/2018 | Chakraborty | B60R 1/00 |
| 2019/0025848 A1 * | 1/2019 | Kolouri | G05D 1/0246 |
| 2019/0231249 A1 * | 8/2019 | Dascalu | A61B 5/746 |
| 2019/0325259 A1 * | 10/2019 | Murphy | G06F 18/2148 |
| 2019/0377949 A1 * | 12/2019 | Chen | G06F 18/217 |
| 2021/0027083 A1 * | 1/2021 | Cohen | G06V 20/70 |
| 2021/0027098 A1 * | 1/2021 | Ge | G06K 9/6256 |
| 2021/0027103 A1 * | 1/2021 | Brower | G06N 3/08 |
| 2021/0027471 A1 * | 1/2021 | Cohen | G06T 7/90 |
| 2021/0042530 A1 * | 2/2021 | Kim | G06V 20/64 |
| 2021/0241035 A1 * | 8/2021 | Sutherland | G06K 9/6253 |

OTHER PUBLICATIONS

Bolte, J. et al., "Unsupervised Domain Adaptation to Improve Image Segmentation Quality Both in the Source and Target Domain", Jun. 16-17, 2019 IEEE/CVF Conference on Computer Vision and Pattern Recognition Workshops (Year: 2019).*

(Continued)

*Primary Examiner* — Alexey Shmatov
*Assistant Examiner* — Devika S Maharaj
(74) *Attorney, Agent, or Firm* — Nicholson De Vos Webster & Elliott LLP

(57) ABSTRACT

Techniques for zero-shot and few-shot transfer of domain-adapted base networks are described. Multiple machine learning task layers are trained using a shared base feature extractor network. At least one task layer is trained with samples and corresponding labels from a first domain as well as a second domain. At least one other task layer is trained with samples and corresponding labels from only the first domain. Ultimately, the other task layer(s) are adapted to generate labels for the first domain via the base network being weighted based on all trainings.

19 Claims, 11 Drawing Sheets

(56) References Cited

OTHER PUBLICATIONS

Kodirov, E. et al., "Unsupervised Domain Adaptation for Zero-Shot Learning" (Year: 2015).*
Google Cloud Vision API, "Detect Multiple Objects", https://web.archive.org/web/20181223160311/https://cloud.google.com/vision/docs/object-localizer, Dec. 3, 2018 (Year: 2018).*
Kim, Y. et al., "NLNL: Negative Learning for Noisy Labels", https://arxiv.org/abs/1908.07387, Aug. 19, 2019 (Year: 2019).*
Ishida, T. et al., "Complementary-Label Learning for Arbitrary Losses and Models", https://arxiv.org/abs/1810.04327v3, Jun. 20, 2019 (Year: 2019).*
Kodirov, E. et al., "Unsupervised Domain Adaptation for Zero-Shot Learning", https://www.cv-foundation.org/openaccess/content_iccv_2015/html/Kodirov_Unsupervised_Domain_Adaptation_ICCV_2015_paper.html (Year: 2015).*

* cited by examiner

ZERO-SHOT TRANSFER OF DOMAIN-ADAPTED BASE NETWORKS

BACKGROUND

Successful machine learning models are built on the shoulders of large volumes of high-quality training data. But, the process to create the training data necessary to build these models is often expensive, complicated, and time-consuming. The majority of models created today require a human to manually label data in a way that allows the model to learn how to make correct decisions. For example, building a computer vision system that is reliable enough to identify objects-such as traffic lights, stop signs, and pedestrians-requires thousands of hours of video recordings that consist of hundreds of millions of video frames. Each one of these frames needs the important elements like the road, other cars, and signage to be labeled by a human before any work can begin on the model one wants to develop.

BRIEF DESCRIPTION OF DRAWINGS

Various embodiments in accordance with the present disclosure will be described with reference to the drawings, in which.

DETAILED DESCRIPTION

Figure 1:
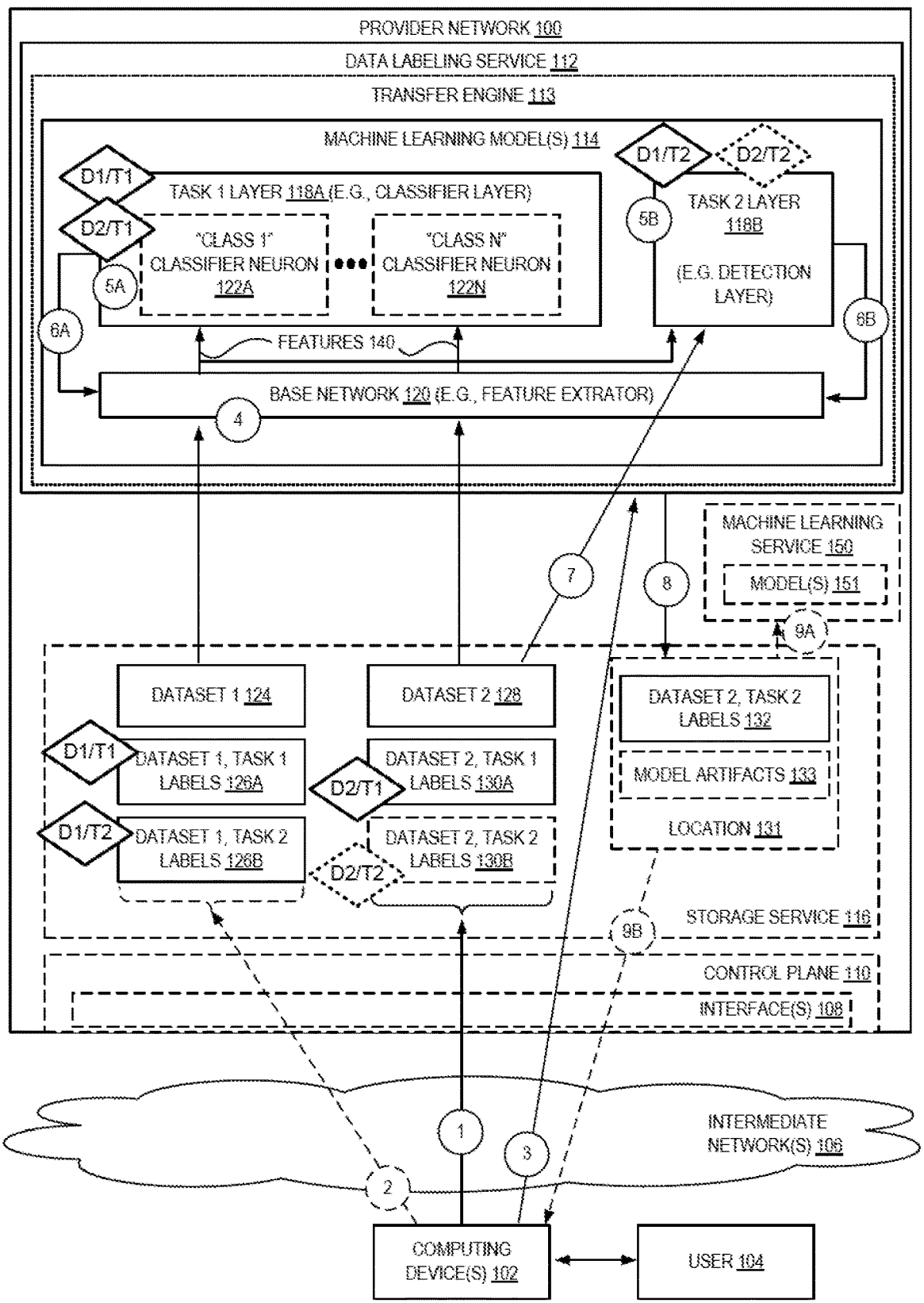
FIG. 1 is a diagram illustrating an environment for zero-shot transfer of domain-adapted base networks according to some embodiments.

The present disclosure relates to methods, apparatus, systems, and non-transitory computer-readable storage media for zero-shot or few-shot transfer of domain-adapted base networks. According to some embodiments, a machine learning model can be trained to perform machine learning tasks for a dataset without needing exemplary dataset labels for those tasks. A base network for a machine learning model is trained on a first (source) dataset and a second (target) dataset for a first type of machine learning task with task-specific labels for these datasets, while the base network is also trained on the first source dataset for a second type of machine learning task with task-specific labels—but without use of the second source dataset (or any labels) for this second type of machine learning task. For the first machine learning task, labels for the different datasets are purposefully set so pairs of different entities from the datasets (of different domains) are treated as being the same and thus yield comparatively similar features by the base network. As a result, by training the machine learning model for the second machine learning task with the first source dataset and its available labels of that task type, due to these forced similarities between features of the typically dissimilar entities within the first and second datasets, the second machine learning task can be successfully performed for the second target dataset despite not having been directly trained on data in that domain, yielding similarly accurate results as if the second machine learning task would be performed for the first source target dataset upon which it had been trained. Embodiments can thus allow users to perform labeling for data in a particular domain without need to provide any labeled examples in that domain, thus enabling these users to build highly accurate training datasets for other machine learning applications extremely quickly. Thus, embodiments significantly reduce the time and effort required to create datasets for machine learning model training via the use of machine learning to automatically label data.

As alluded to above, to create robust machine learning (ML) based applications and systems, it is typically imperative to have large amounts of high-quality labeled data from which ML models can be trained upon. However, it requires significant effort and time to generate these labels, and thus generating custom, sophisticated ML systems previously was only available for large organizations with significant resources enabling this data collection and labeling to be performed. However, recent developments in active learning techniques that utilize both human labelers and machine learning based labeling systems have begun to allow for more rapid dataset labeling.

Although these techniques are extremely beneficial, it still remains difficult and time-intensive to generate high-quality labels for samples of a dataset in many scenarios. For example, it remains extremely tedious to manually label pixels for segmentation purposes. As another example, a user may have a dataset with high-quality labels of a first type (also referred to herein as an "ML task label type") such as classification labels (e.g., indicators of which class(es) a sample belongs to)—which might have taken significant resources to generate—and this user may also want high-quality labels of one or more other ML task label types, such as object detection labels (e.g., coordinate or bounding box type information identifying where in an image a particular object exists) or segmentation labels (e.g., per-pixel class segmentation values). Generating yet another set of labels for the dataset-whether using humans or humans with technological aids (such as in active learning)—remains an intensive process.

Embodiments disclosed herein provide for zero-shot (or few-shot) transfer of domain-adapted base networks, enabling users to be able to obtain high-quality labels of different or additional ML task label types without needing to provide any (or many, as in the case of "few-shot" transfer) exemplary labeled dataset specimens in the proper domain for use.

FIG. 1 is a diagram illustrating an environment for zero-shot transfer of domain-adapted base networks according to some embodiments. In FIG. 1, a data labeling service 112 and an optional storage service 116 are implemented within a multi-tenant provider network 100, though in other embodiments the zero-shot/few-shot techniques disclosed herein can be implemented in other environments, such as within a private network, on a single computing device or cluster of computing devices, etc. The data labeling service 112 and optional storage service 116 may be implemented as software executed by one or multiple computing devices, as hardware, or as a combination of both.

A provider network 100 (or, "cloud" provider network) provides its users 104 with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users 104 (or "customers") of provider networks 100 may utilize one or more user accounts that are associated with a customer account, though these terms may be used somewhat interchangeably depending upon the context of use. Users 104 may interact with a provider network 100, via use of computing device(s) 102, across one or more intermediate networks 106 (e.g., the internet) via one or more interface(s) 108, such as through use of application programming interface (API) calls, via a console implemented as a website or application, etc. The interface(s) 108 may be part of, or serve as a front-end to, a control plane 110 of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of server devices from the data plane server devices, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code-typically without the user having any control of or knowledge of the underlying compute instance(s) involved.

For example, in various embodiments, a "serverless" function may include code provided by a user or other entity-such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As shown in FIG. 1, a user 104 may utilize a computing device 102 to interact with the provider network 100 and specifically the data labeling service 112 seeking labels of a particular ML task label type for a dataset. For example, the user 104 may upload a dataset-here, denoted as dataset '2'

128—to a location such as an object storage location provided by a storage service 116 of the provider network 100 at circle '1'.

A dataset can be a collection of homogeneous pieces or "samples" of data such as a collection of digital images, videos, audio clips, comma separated values (CSV) files, etc.). The user 104 may have a set of "labels"-here, denoted as labels 130A (and optionally, labels 130B)—associated with the samples of the dataset. Labels may be attributes of objects in a dataset. For example, labels may include location information (e.g., coordinates, or other bounding box information) specifying a region of the sample including an object (e.g., a bounding box surrounding a particular object depicted within an image or video), a species or type of an animal represented in a picture (as a "class"), words in an utterance, etc.

Labels may be of a particular type corresponding to a particular ML task. As is known to those of skill in the art, a variety of types of ML tasks exist ranging from classification, object detection, segmentation, and the like. Each of these ML tasks may have at least one associated label type. For example, for a ML task of classification, the associated label type may be an indicator of a class of the corresponding sample (e.g., "class 0" or "class 1", where a "class 0" label may correspond to a particular type of animal being present within a corresponding image sample and a "class 1" label may correspond to a different type of animal being present within a corresponding image sample). As another example, for a ML task of object detection, the associated label type may be an indicator of a bounding box (e.g., bounding box or other coordinate-type information) defining where in the corresponding sample a particular object is located.

In this example of FIG. 1, the user 104 may have a set of labels 130A for the dataset 128 that are of a first ML task type (e.g., classification). This set of labels 130A may be of a relatively "easy" type of label to obtain, and the user 104 may seek to obtain one or more other types of labels for one or more other ML task types, such as object detection labels, segmentation labels, or the like, which may be more difficult/burdensome to obtain. In some embodiments, the data labeling service 112 can generate different types of labels in such a scenario using the zero-shot transfer techniques disclosed herein. However, in some embodiments a user 104 may provide another type of labels 130B for some or all of the samples of the dataset. For example, a user 104 may provide just a few labels 130B (e.g., fewer than half of the samples having a label, fewer than five or ten percent of the samples having a label, fewer than ten or twenty labels, etc.) of a task type that the user wants a complete set of labels for, and the data labeling service 112 can thereafter generate the full set of labels for that task type using the transfer techniques disclosed herein according to a "few-shot" approach. Either or both of sets of labels 130A, 130B may include fewer labels than the number of samples.

In some embodiments, the user 104 may also provide (e.g., upload) at optional circle '2' another "calibration" or source dataset (dataset '1' 124) and upload or otherwise provide (such as via human and/or automated processes provided by the data labeling service 112 as described later herein with regard to FIGS. 6-7) multiple sets of labels-here shown as labels 126A (that correspond to a first ML task type of "task 1", such as classification) and labels 126B (that correspond to a second ML task type of "task 2", such as object detection). Notably, these labels 126A-126B include one set of labels that is of the same ML task label type as those of the customer's "target" dataset 128 labels 130A (both denoted as being for "task 1", which may be classification labels), and yet also include at least one other set of labels for a different ML task type—e.g., object detection.

This "other" dataset 124 (or "source" dataset) may be a gold standard type dataset provided by the provider network and made available to its users, which may be a very large collection of samples, and may have a significant number of different types of labels associated therewith. As one example, this dataset 124 may include thousands, tens of thousands, or more samples (e.g., different images including different objects such as animals, vehicles, plants, people, etc.).

In contrast, the other dataset 128 provided by the user 104 in some manner may be a more limited dataset (in terms of objects depicted therein, number of samples, etc.) that may be of specific value to that user 104 and thus, may be in a different "domain" than that of the source dataset 124. For example, this "target" dataset 128 may include a collection of image samples, which potentially may depict a few specific types of animals of interest to the user 104 for some application, for example.

At circle '3', the computing device 102 may transmit one or more messages indicating a request to generate one or more types of labels for the dataset '2' 128 to the data labeling service 112. For example, the user 104 may utilize an application or web-based console presented by the computing device 102 to configure a labeling job based on the dataset 128, and thus may provide an indication of the dataset 128 to be used (e.g., a dataset name or identifier, an identifier of a storage location of the dataset, or the like), an indication of the available labels 130A (e.g., a label-set name or identifier, an identifier of a storage location of the labels, or the like) and the type of these labels, etc. The user 104 may also optionally identify the source dataset '1' 124 to be used (from potentially many different datasets available). The user 104 may also identify one or multiple desired label types (ML task label types) sought to be obtained—e.g., "object detection labels", or may indicate that the user 104 desires for the data labeling service 112 to identify which particular types of labels can be generated with sufficient accuracy/confidence. As a result of this configuration, the computing device 102 may transmit the one or more messages via an interface 108 of the provider network 100 to the data labeling service 112.

In some embodiments, as part of circle '3' the user 104 may utilize an application, web-based console, etc., to utilize the data labeling service 112 as a "platform." For example, similar to how the user may provide the dataset '1' 124, dataset '2' 128, and/or labels 126/130, in some embodiments the user may also or alternatively provide other components disclosed herein such as the base network 120, task layers 118, loss functions, etc. The user 104 may cause representations or identifiers (unique identifiers, resource identifiers such as URLs) of these components at circle '3' (e.g., ML models or components thereof, loss functions, datasets, labels, etc.) to be transmitted to the data labeling service 112 or to a storage location provided by a storage service 116 (for use by the data labeling service 112). In some embodiments, one or more of these components may alternatively or additionally be selected, by the user, from a library of components offered by the data labeling service 112 or provider network 100, and these selected identifiers may be transmitted at circle '3.'

Notably, the labels 130A for the user's dataset 128 are purposefully set so that they overlap with labels 126A of the source dataset 124. This may be performed by the user 104 initially by setting the labels 130A with particular values known to be used in the source dataset's labels 126A, or may be configured in an "on-demand" manner, such as via the user's 104 use of the application/console when configuring the labeling job (e.g., by indicating mappings between existing label values in the labels 130A and replacement values based on those used in the source dataset's labels 126A, and thus the data labeling service 112 may update or utilize these replacement label values).

For example, the source dataset 124 may include image samples depicting some number of different animals, and the associated labels 126A may be "class values" (labels for a ML task type of classification) associated with the animals—e.g., "class 1" may be for cats, whereas "class 2" may be for dogs.

The user's dataset 128, however, may include image samples depicting fish and ducks. Accordingly, the labels 130A may be set to use common (i.e., the same or similar) labels as those used in the source dataset's labels 126A for the classification task—e.g., "class 1" may be used for the fish samples, whereas "class 2" may be used for the duck samples.

Responsive to receipt of the labeling job request sent at circle '3', the data labeling service 112 may cause its transfer engine 113 to begin training one or more ML models 114 (e.g., neural networks, etc.) having a common base network 120 (such as one or more neural network layers, or via some other type of feature extractor, such as a support vector machine (SVM) for example) for multiple different "tasks." Thus, the one or more ML models 114 may be a large single "model" having one base network 120 and multiple different "task" layers—e.g., task '1' layer 118A (e.g., for ML classification, which may include multiple classifier neurons 122A-122N to detect the existence or non-existence of particular classes), task '2' layer 118B (e.g., for object detection), and possibly other layers. For example, the one or more ML models 114 may be a Siamese-type neural network known to those of skill in the art. Alternatively, the one or more ML models 114 may be multiple models (e.g., a first model with a first task '1' layer 118A and a base network 120, and a second model with a second task '2' layer 118B and a base network 120) where the base network 120 can be "shared" between the models by having common weights shared between the base networks 120. In some embodiments, ones or all of the base network 120, task layers 118, datasets 124/128, labels 126/130, loss functions, etc., may be provided by (e.g., via an upload, or submission of a resource identifier that can be used to obtain these elements) or selected (e.g., from a "library" of components of the provider network, or another system) by the user 104, and thus the data labeling service 112 may act as a platform allowing users 104 to bring some or all components for implementing the transfer techniques disclosed herein.

Thus, the one or more ML models 114 can be jointly trained on both a first ML task (e.g., classification) at circle '5A' using both the source dataset 124 and the user's dataset 128 as well as the corresponding labels for that task type—labels 126A (shown with the diamond "D1/T1") and labels 130A (shown with the diamond "D2/T1")—and also trained on a second (or more) ML task at circle "5B", but in this case only using the first source dataset 124 and its task-specific labels 126B (shown with the diamond "D1/T2", with regard to "zero-shot" transfer) and optionally with samples from dataset 2 128 with its associated labels 130B (with regard to "few-shot" transfer). Thus, the samples from these datasets 124, 128, are provided to the base network 120 at circle '4', which generates features 140 (or embeddings) for the samples, which may be a multi-dimensional vector as is known to those of skill in the art. These features 140 are used to train the task layers 118A-118B with the corresponding labels, and further backpropagate updates to the weights of the base network 120 at circle '6A' and '6B' (e.g., based on use of loss function(s) as is known to those of skill in the art). For example, updates to the base network 120 may be backpropagated based on both the updates from the different task layers—e.g., by averaging them to backpropagate average gradients through the "stem" base network 120 from the task "head" layers 118A-118B.

Figure 2:
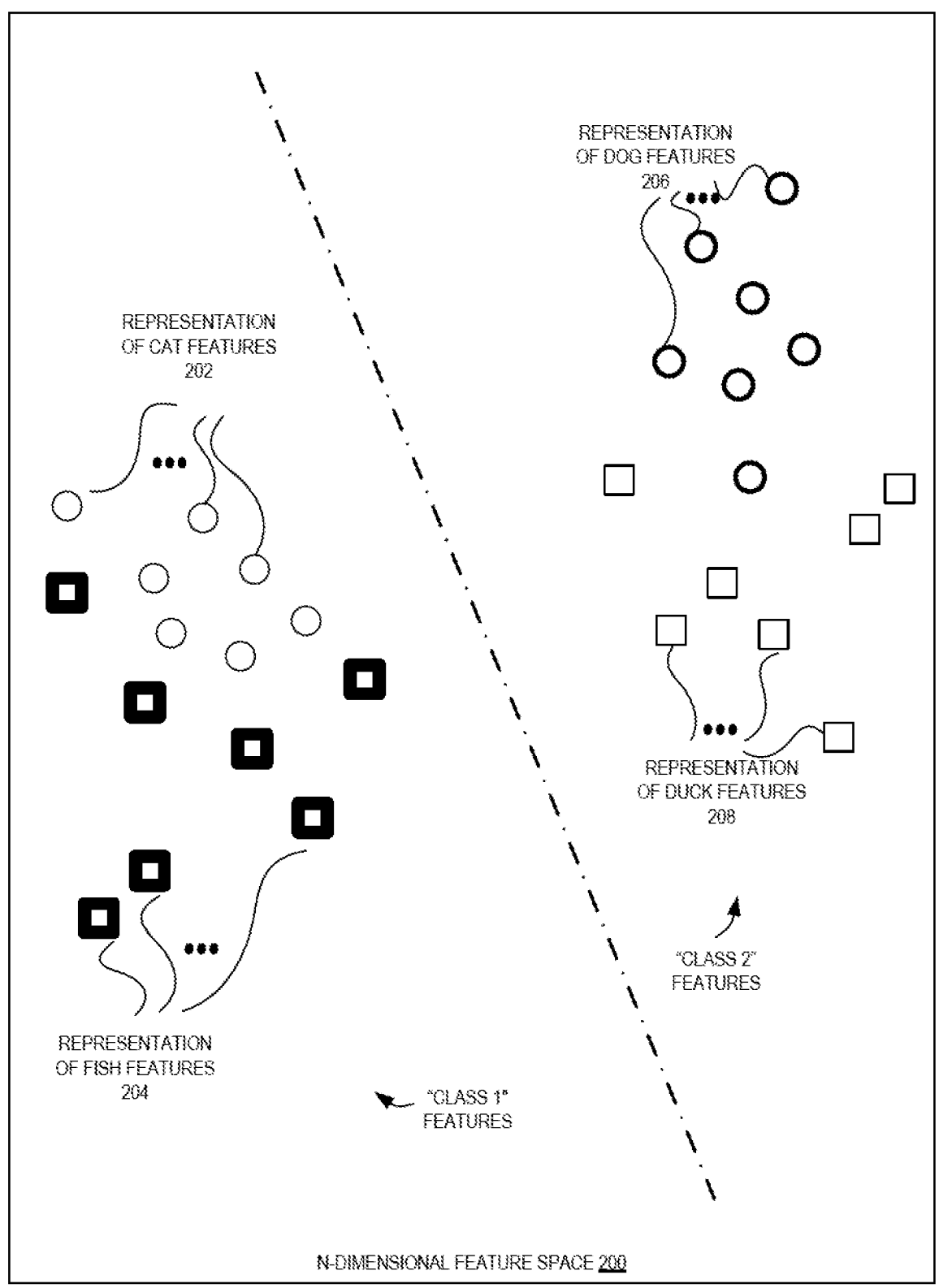
FIG. 2 is a diagram illustrating forced feature clustering of dissimilar entities in an n-dimensional feature space for zero-shot transfer of domain-adapted base networks according to some embodiments.

In this manner, the base network 120 is adapted to generate features for corresponding pairs of samples (based on the shared/similar labels, as described above) that are relatively "close" in the latent feature space for these samples. Thus, in the simple example presented above, features 140 for both cats (from the first dataset 124) as well as features for fish (from the second dataset 128) will be very close in the space to each other. For example, FIG. 2 is a diagram illustrating forced feature clustering of dissimilar entities in an n-dimensional feature space for zero-shot transfer of domain-adapted base networks according to some embodiments. In this feature-space 200, representations of features for cats 202 (fine-lined circles) and fish 204 (thick-lined squares) are shown as being comparatively close to each other in this multi-dimensional space 200, whereas representations of features for dogs 206 (thick-lined circles) and duck 208 (thin-lined squares) are shown as being comparatively close to each other and comparatively far away from the cat and fish features. This feature beneficially allows for the task layer 118B—which was not directly trained on the second dataset 128 (or may have been trained with only a very few number of samples, in a "few-shot" manner)—to be able to work well for this second dataset 128 in a very powerful and still accurate manner. This result occurs because the relationship between the corresponding tasks has been learned via use of the first dataset, and this relationship becomes embedded into the base network 120 to transfer the relationship knowledge into the new domain.

Turning back to FIG. 1, the base network 120 and the task '2' layer 118B can be used to generate task '2' specific labels 132 for the target dataset 128 (or other samples of the same domain provided by the user or an application associated with the user) as shown at circle '7', and store these labels 132 at circle '8' to an output storage location 131 (e.g., of storage service 116, where the location may have been identified by the user 104 at the time of the labeling job creation and passed in the request message(s) at circle '3'). Thereafter, these labels 132—which were effectively obtained for "free" by the user 104 in that the user 104 did not strictly have to provide exemplary labels for this particular task type with samples—can be used in a variety of ways, such as part of another machine learning job run by a machine learning service 150 as shown at optional circle '9A' and/or sent back to a computing device 102 of the user 104 at optional circle '9B' for another use. Additionally or alternatively, a set of model artifacts 133 (e.g., representations of one or more machine learning models, such as a set of structural definitions, weights, etc.) corresponding to the "trained" machine learning model(s) 114 may also be output to an output storage location 131, used to deploy a model 151 for inference (e.g., behind an endpoint, e.g., a private or publicly-routable internet protocol (IP) address, via use of a machine learning service 150 at circle '9A'), provided to the user 104 via transmission at circle '9B' to a computing device 102, etc.

Figure 3:
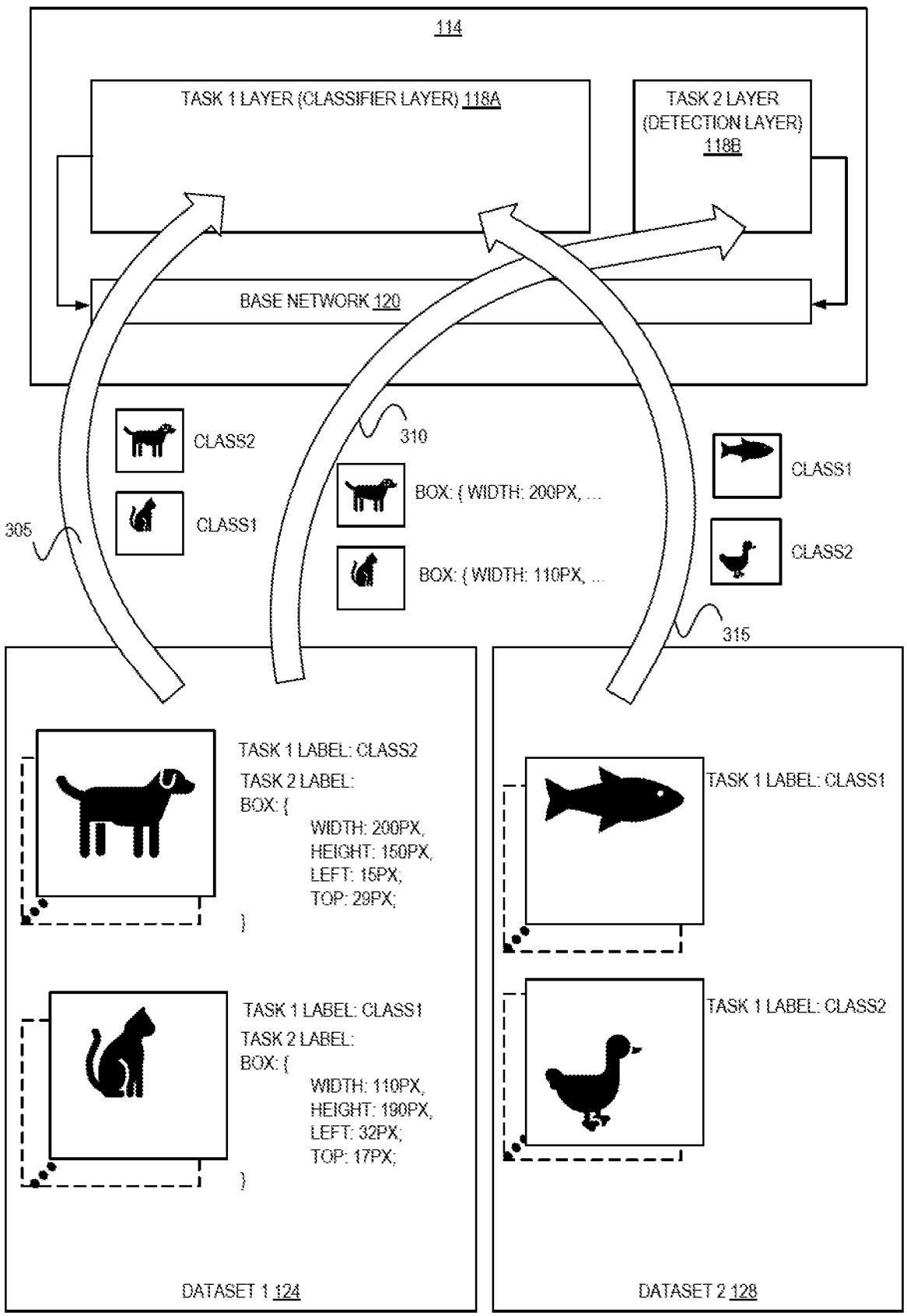
FIG. 3 is a diagram illustrating training a model including a classifier and a detector for zero-shot transfer of object detection capabilities from a first dataset to a second dataset according to some embodiments.
Figure 4:
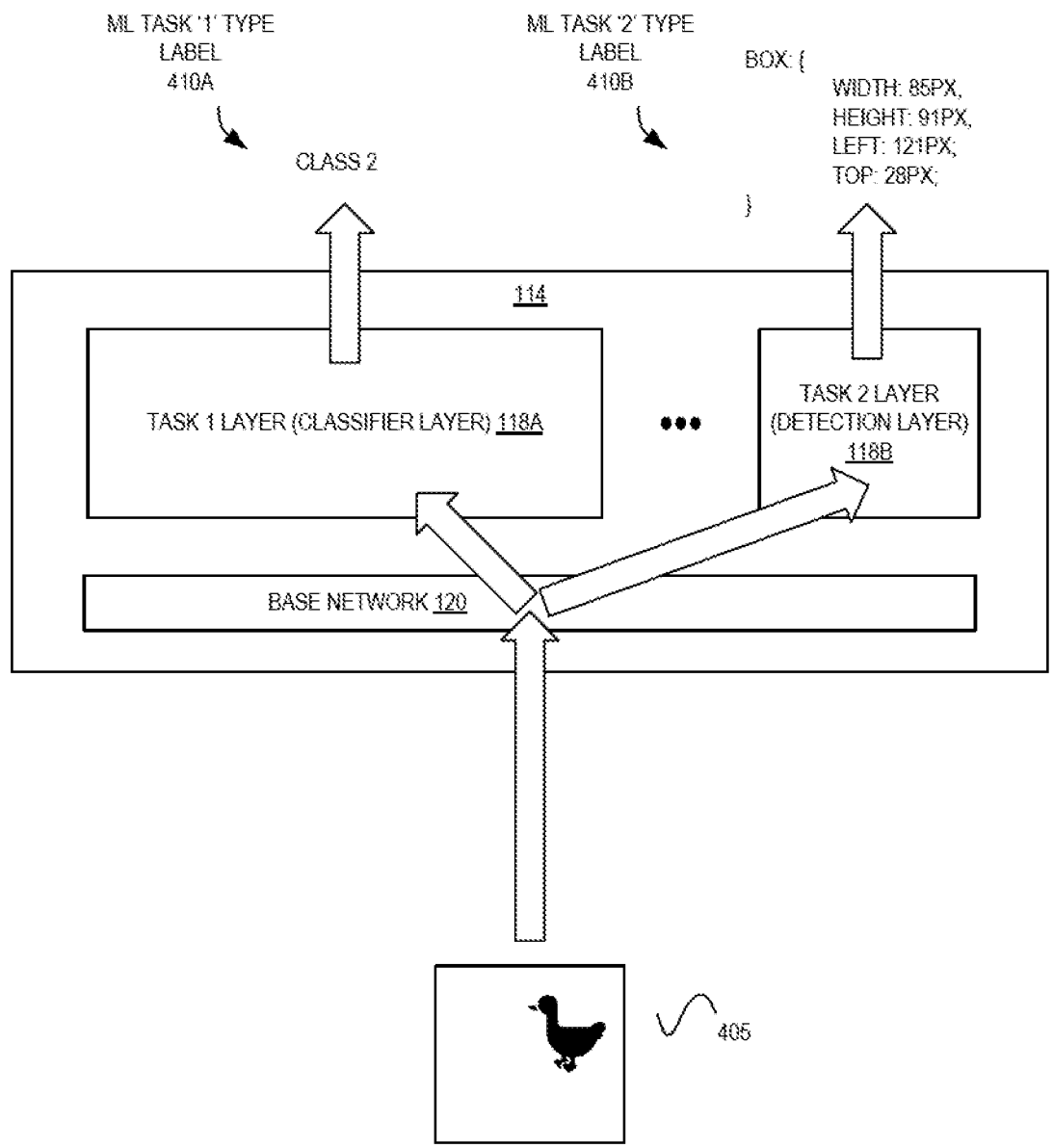
FIG. 4 is a diagram illustrating the use of a trained model of FIG. 3 for transferred object detection according to some embodiments.

For the sake of illustration, a graphical example is presented with regard to FIG. 3 and FIG. 4. FIG. 3 is a diagram illustrating training a model including a classifier (e.g., task '1' layer 118A) and a detector (e.g., task 2 layer 118B) for zero-shot transfer of object detection capabilities from a first dataset 124 to a second dataset 128 according to some embodiments. Following the earlier example, the first source dataset may include numerous image samples that may depict, optionally among other entities, dogs and cats. Each of these samples of the dataset may have associated therewith multiple labels corresponding to multiple different ML tasks. For example, the illustrated dog sample has associated therewith a task '1' (classification) label of "class2" and also another task '2' (object detection) label providing bounding box type information—in this case, the width of the box, the height of the box, and the top-left position of the box within the image sample in terms of pixel distances from the top-left of the overall image ("left" and "top" values). Similarly, the cat image sample also has its own labels—a task '1' label of "class1" and a task '2' bounding box label.

The user's target dataset 128 may also include image samples but of a different domain—here, including different types of entities being represented-fish and ducks. Notably, only labels of one ML task label type are provided—task '1' classification labels—and these labels are purposefully chosen to overlap with ones used in the first source dataset 124. Thus, the fish and the cat both have labels of "class1" while the dog and the duck both have labels of "class2."

To train the model(s), features from the samples of dataset '1' 124 are provided to the task '1' layer 118A with the corresponding task '1' labels as shown at arrow 305. Additionally, features of the samples of dataset '2' 128 along with the corresponding task '1' labels are also provided to the task '1' layer 118A as shown at arrow 315. Jointly, the layer 118B for the "desired" task '2' is provided with the features from samples of dataset '1' 124 and the task '2' labels—thus, the task '2' layer 118B is directly trained with the data from dataset '1' 124. However, due to both datasets influencing the generation of features (via both datasets, sharing common labels, influencing the task '1' layer 118A), the task '2' layer 118B may thus handle samples from the target dataset 128 properly!

Accordingly, FIG. 4 is a diagram illustrating the use of a trained model 114 of FIG. 3 for transferred object detection according to some embodiments. With the model 114 having been trained as shown in FIG. 3, this model 114 can then perform its task(s) to generate a label 410 for a sample from the target dataset (or other dataset with a similar domain)—as shown here, an image of a duck-accurately. Thus, the input 405 (here, an image) can thus be provided to the one or more ML models(s) 114, run through the base network 120 to generate features, and the features are fed through one or more layers 118A-118B to result in one or more labels 410A-410B-here, a class label 410A of "class2" and a coordinate label 410B identifying a bounding box encapsulating the found entity (of a duck). In some embodiments, this inference can be performed using a model deployed behind an endpoint in the provider network, where inference requests can be issued by clients (inside or outside of the provider network) carrying the input (or identifying the input, which can be retrieved) and run by the one or more ML models 114 to generate the label(s), which can thereafter be returned to the calling client.

Figure 5:
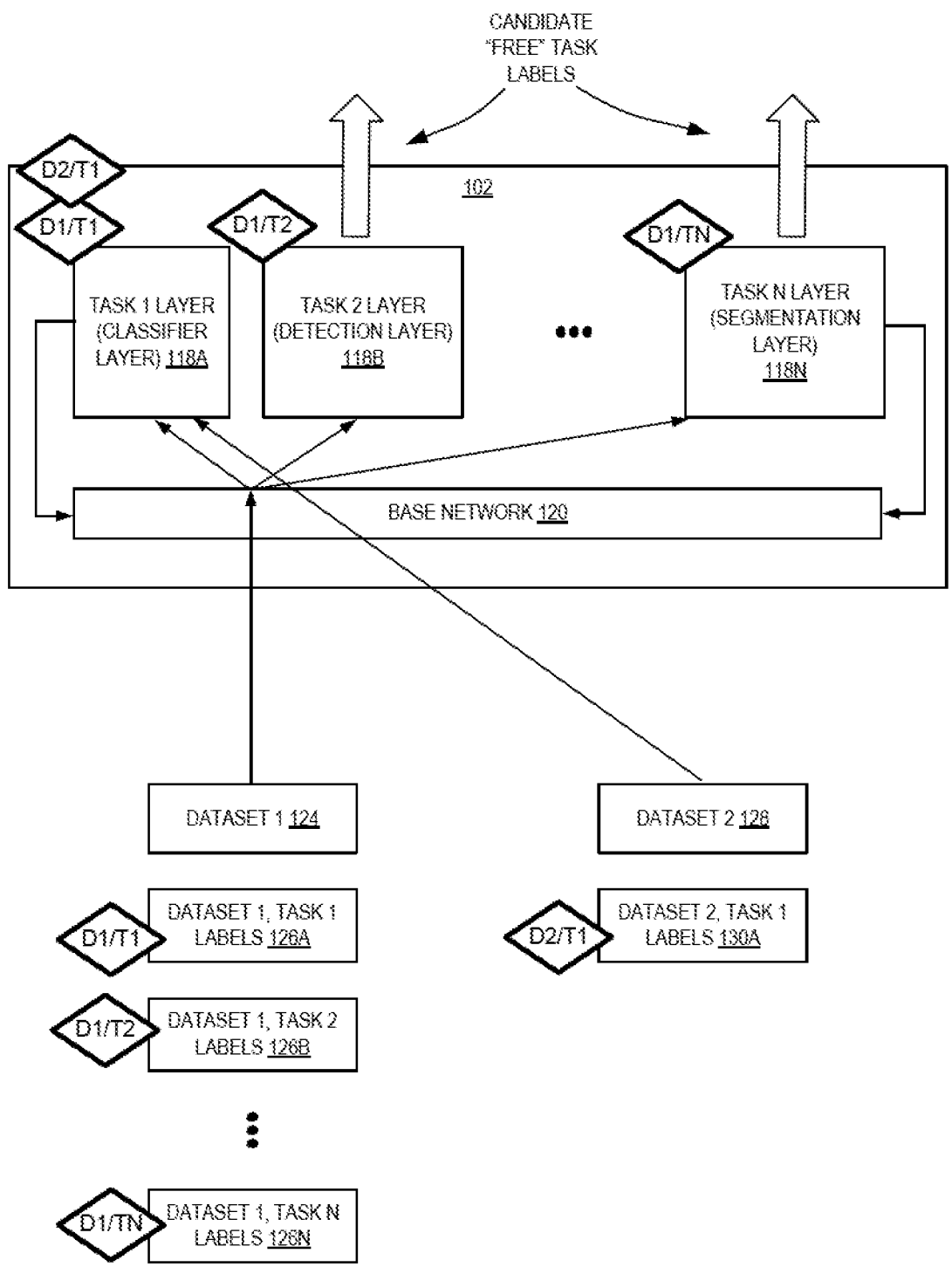
FIG. 5 is a diagram illustrating an environment for zero-shot transfer of domain-adapted base networks for multiple machine learning task types according to some embodiments.

These zero/few-shot transfer of domain-adapted base network techniques can be flexibly used in other applications as well. It may be the case that a user seeks multiple types of labels to be generated or may seek for the system to determine which types of labels it can generate with sufficient accuracy. Accordingly, FIG. 5 is a diagram illustrating an environment for zero-shot transfer of domain-adapted base networks for multiple machine learning task types according to some embodiments. In some embodiments, a large "gold standard" type dataset 124 with many different types of label sets 126A-126N for different tasks (as implemented by layers 118A-118N) may exist. Optionally, these layers and the base network may be pre-trained. Upon a user providing another dataset 128 of a different domain, the retraining (or initial training) process may occur again for multiple-here, three or more-different task layers, resulting in the base network 120 weights being adapted as described herein and thus multiple possible task layers being made available for use to generate labels for the dataset 128.

In some embodiments, the utility of these layers can be tested, either in an autonomous manner or with some human involvement. For example, these additional layers can generate labels for one or more samples of the dataset and the results can be evaluated by other ML models or humans (such as a human workforce, or the user themselves), allowing for the accuracy of the labels to be ascertained. If the accuracy of these labels for a type of task meets or exceeds a threshold, the data labeling service 112 may generate and provide those types of labels for the user.

Figure 6:
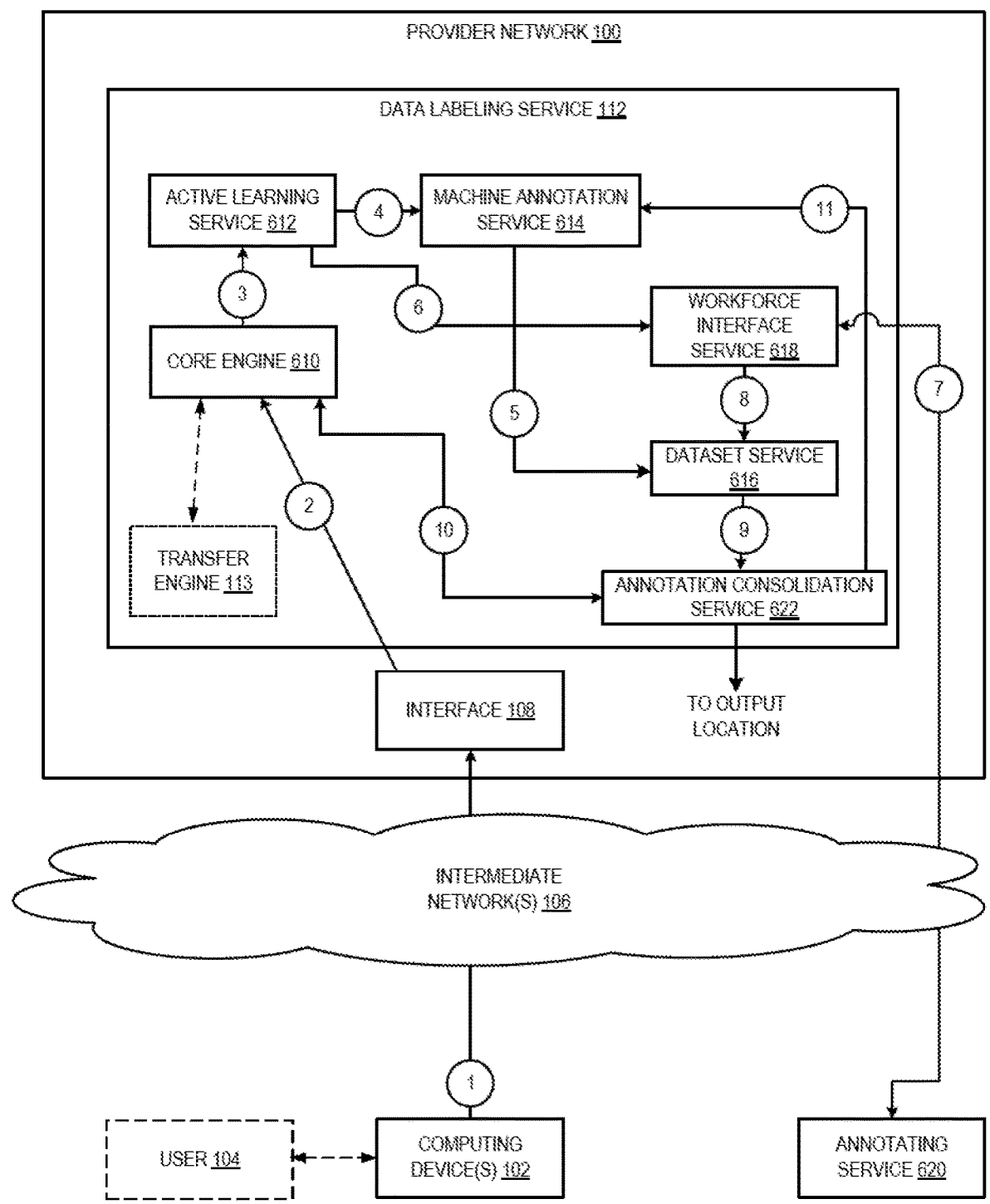
FIG. 6 is a diagram illustrating an environment for active learning-based data labeling according to some embodiments.

For further detail regarding functionalities of an exemplary data labeling service, FIG. 6 is a diagram illustrating an environment for active learning-based data labeling according to some embodiments. These active learning-based techniques may be offered and used separately from the zero-shot techniques disclosed herein, or may be used to assist—for example, by generating "source" datasets for use, for verifying the quality of labels generated by the zero-shot system, etc. For example, the core engine 610 of the data labeling service 112 may use the transfer engine 113 as described herein and optionally also the active learning service 612 component to generate labels to assist in source label generation, label evaluation, etc.

According to some embodiments, an active learning-based data labeling service enables a user 104 to build and manage large, high accuracy datasets for use in various machine learning systems. In various embodiments, machine learning may be used to automate annotation and management of the datasets, increasing efficiency of labeling tasks and reducing the time required to perform labeling. In the past, labeling has been performed through the brute force efforts of human labelers who are given a dataset to label and return labels (e.g., a description of objects in the dataset, words spoken, bounding boxes around objects, etc.). Embodiments utilize active learning systems to reduce the amount of a dataset that requires manual labeling. As subsets of the dataset are labeled, this label data is used to train a model which can then identify additional objects in the dataset without manual intervention. The process may continue iteratively until the model converges (e.g., identifies objects within an accuracy threshold). This enables a dataset to be labeled without requiring each item in the dataset (e.g., image, video frame, video file, audio files, audio tokens, etc.) to be individually and manually labeled by human labelers.

Embodiments perform active learning and auto-annotation to reduce the amount of data to be manually annotated. As a result, inference can be performed on the dataset in each iteration, increasing the speed at which the dataset is annotated. Embodiments increase the speed at which auto-annotation can be performed. Rather than waiting for a model to be trained to be accurate for all of the data in a dataset, the data can be iteratively auto-annotated while the model is still being trained. This enables the dataset to be quickly and accurately labeled.

As shown in FIG. 6, at numeral 1, a user 104 using a computing device 102 can provide access to a dataset through an interface 108 (also referred to as a user interface). As discussed, the user interface 108 can be an API, console, or other interface. For example, the user interface 108 may be a front-end interface for data labeling service 112. A dataset can be a collection of homogeneous pieces or "samples" of data (such as image data, video data, comma separated values (CSV) files, etc.). A dataset may be a raw unlabeled dataset, a partially labeled dataset, a gold standard dataset, or a training dataset. As used herein, a gold standard dataset may refer to a dataset that has been verified as being accurately labeled. In some embodiments, the dataset may be stored in a user-owned or controlled data store, such as an object store, database, or other data store. The user can provide credentials to access the dataset (e.g., username and password, keys, etc.) and a location of the dataset (e.g., a Uniform Resource Locator (URL) of the dataset or another identifier of a storage location of the dataset, such as within a storage service of the provider network 100). In some embodiments, at numeral 1, the customer may also specify one or more of a gold standard dataset, a target label space, a desired quality threshold, and/or an annotation budget.

Labels may be attributes of objects in a dataset. For example, labels may include a region including an object (e.g., a bounding box surrounding a particular object), the species of an animal in a picture, the words in an utterance, etc. Labels are the outputs of annotations after the annotations have been consolidated and have achieved a quality score above a given threshold. As such, as used herein, a label refers to the true underlying object property, while annotations refer to the tags or other outputs by a labeling task (e.g., by a human labeler or machine annotation).

The label space may be a sub-graph of the overall graph of predefined labels that can be used for annotations for specific dataset objects. For example, for a machine learning model to recognize species of birds, the label space includes labels (and associated label classes) for various species of birds. These labels can be either predefined (e.g., a closed label space) or incrementally defined by annotators (e.g., an open label space)

In some embodiments, the user can specify a workflow to be used for labeling. The workflow may be provided by the active learning-based labeling service or may be a custom workflow specified by the user. Each workflow can be a nested workflow comprising a series of steps corresponding to one or more of active learning, machine annotating, manual annotating, annotation consolidation and quality score computation, model training, and then outputting of training datasets and/or models.

At numeral 2, the various properties described above that are received from the user may be provided to the core engine 610. The core engine 610 drives the overall workflow definition, execution, monitoring, and orchestration behind the execution of multiple concurrent labeling workflows executed by the data labeling service 112. The core engine 610 is responsible for triggering/calling functions, activities and tasks on multiple different microservices as part of the overall execution of a workflow. The core engine may also maintain the state (in a multi-tenanted manner) related to the execution of workflows and associated annotation tasks for multiple users.

At numeral 3, when the workflow is started, the dataset specified by the user can be provided to active learning service 612 ("ALS"). ALS 612 may implement one or more active learning techniques as are known in the art. In some embodiments, the active learning technique used may depend on the type of data in the dataset (e.g., image data, audio data, video data, etc.). Additionally, the active learning techniques used may be specified by the user in a custom workflow or may be built-in as part of data labeling service 112. The ALS 612 manages the selection of dataset objects that are to be auto-labeled and the selection of dataset objects that are to be manually labeled.

Active learning is a machine learning procedure that can be useful in reducing the amount of annotated data required to achieve a target performance. Active learning starts by incrementally training a model with a small, labeled dataset and then applying this model to the unlabeled data. For each unlabeled sample, ALS 612 estimates whether this sample includes information that has not been learned by the model. An example of an active learning technique is to train an object detection model that takes an image as input and outputs a set of bounding boxes. To train such an object detection model, the training and validation images of the detector are annotated with a bounding box per object and its category. Such a technique may start with a small training set of annotated images to train a baseline object detector. In order to improve the detector by training with more images, this technique continues to collect images to annotate. Rather than annotating all newly collected images, based on different characteristics of the current detector, the ALS 612 can select a subset of the images to be manually labeled. Once annotated, these selected images are added to the training set to incrementally train the object detection model. The entire process continues to collect more images, select a subset with respect to the object detector, annotate the selected ones with humans, incrementally train the detector and so on. Other data, such as video data, audio data, etc. may also be used in such a system.

ALS 612 can perform active learning for unlabeled or partially unlabeled datasets and use machine learning to evaluate unlabeled raw datasets and provide input into the data labeling process by identifying a subset of the input data to be labeled by manual labelers. In some embodiments, ALS 612 randomly selects a sample of the input dataset for labeling. In some embodiments, ALS 612 selects the subset of the dataset using uncertainty sampling. In this example, a model used by the ALS 612 preferentially selects examples for which the model produces a low confidence of identification. Other approaches may include representativeness-based sampling where the model selects a diverse set that represent the input dataset while limiting redundancy among the subset.

Once a subset of the input dataset is identified to be auto-labeled, the subset may be annotated. For example, in some embodiments, the subset may be sent to machine annotation service 614, as shown at numeral 4. Machine annotation service 614 may use an existing model that has been trained on the same or similar label space which is selected for the input dataset. These machine annotations may be output to a dataset service 116 at numeral 5. In some embodiments, dataset service 116 can communicate with WIS 618, machine annotation service 614, and core engine 610 to manage the flow of data to be labeled by data labeling service 112 and to manage the resulting labels for the data generated by data labeling service 112. Additionally, or alternatively, at numeral 6, the subset identified by the ALS 612 to be manually annotated can be sent to a workforce interface service 618 ("WIS"). The WIS 618 can interface with various manual annotators including crowdsource annotators, private (e.g., in-house) annotators, and/or annotating service providers (collectively annotating service 620). The type and/or variety of labelers may be selected by the user when starting a new labeling workflow, as discussed above. WIS 618 can present the subset of the input dataset to the selected annotating service 620 at numeral 7. The subset may then be annotated by the selected annotators and the annotations may be returned to WIS 618. These annotations may be stored in dataset service 616 at numeral 8.

Once annotations have been received from the WIS 618 and optionally from machine annotation service 614, the annotations can be consolidated into labels by annotation consolidation service 622, as shown at numeral 9. Annotation consolidation may refer to the process of taking annotations from multiple annotators (e.g., humans and/or machines) and consolidating these together (e.g., using majority-consensus heuristics, removing bias or low-quality annotators, using probabilistic distribution that minimizes a risk function for observed, predicted and true labels, or other techniques). For example, based on each annotators' accuracy history, their annotations can be weighted. If one annotator has a 50% accurate history, their annotations may have a lower weight than another annotator with a 100% accurate history.

In some embodiments, the annotation consolidation service 622 can maintain a label score and a worker score when performing annotation consolidation. During consolidation, annotation consolidation service 622 can fetch current label scores for each piece of data in the dataset (e.g., image, video frame, audio utterance, etc.) and current worker scores for the annotator who provided the annotations on that piece of data. A new label score and worker scores can be computed for the piece of data based on previous state and currently received new annotation. The label score can be compared to a specified threshold. If the label score is higher than the threshold then no additional annotations are required. If the label score is lower than the threshold then the data may be passed to additional annotators to be further annotated by annotating service 620. At numeral 10, once the label score is higher than the threshold, then the core engine 610 can be updated to indicate that the subset of the input dataset has been labeled. The active learning loop may continue to execute with the core engine invoking the active learning service 112 to label a new subset of the input dataset that is still unlabeled or partially labeled. The annotation consolidation service can output the labeled subset of the input dataset to an output location, as discussed further below.

In some embodiments, the labeled subset of the input dataset can be used to train the active learning service model. As shown at numeral 11, the labeled subset of the input dataset can be provided to the machine annotation service 614. The machine annotation service 614 may include a training service that can generate a new model, or update the previously used model, using the labeled subset of the input dataset. In some embodiments, a separate training service (not shown) may obtain the labeled subset of the input dataset from the annotation consolidation service and may use the labeled subset of the input dataset to further train the model maintained by the machine annotation service 614. The above described process may then be repeated using the updated model. For example, if the updated model has converged, then the remainder of the input dataset can be accurately identified. If the updated model has not converged, then a new subset of the input dataset can be identified for further labeling according to the process described above. In some embodiments, the data labeling service 112 can output one or more of the converged model or the labeled dataset, as described further below.

In some embodiments, the data labeling service 112 may also output various performance metrics, such as performance against the annotation budget, quality score of annotated labels and performance against the defined quality threshold, logs and metrics in a monitoring dashboard, and/or an audit trail of annotations tasks as performed by annotators. The quality score can be a numerically computed value to measure the quality of consolidated labels. This score is compared to a desired quality threshold (which may be a default value or may be provided by the user as an input) to determine whether consolidated labels have achieved the desired quality level and hence are considered trained labels. This quality score can be expressed as an output of a risk function on a probability distribution for real, true and predicted labels.

In various embodiments, a user can provide an unlabeled dataset which they would like to label. They might also bring a pre-trained supervised machine learning model, as well as some data which has already been labeled in the past. These inputs are fed into the data labeling service. The first step of the service is to prepare for the main loop. The preparation produces a validation dataset, a first pre-trained machine learning model, and first estimates of the quality of every worker in the pool. Then the main loop runs, and produces the final model, as well as the fully labeled dataset, with labels for every object of the original unlabeled data, as well as final worker quality estimates.

Before starting the loop, the data labeling service can prepare data for it. The preparation step returns validation data, pretrained model, and worker quality estimate. First, a random subset of the unlabeled dataset is selected for validation and sent to human annotators. During all of the human annotation processes, worker quality is estimated. There are a few options for the start of the loop. If the user brings a pre-trained model, it can be passed along to the main loop. If there is no pretrained model, but there is some prelabeled data, this data is used to train a default model for the selected modality. Even if the labels are not very reliable, prelabeled data can be used to train the model, as training can often be resilient to some noise in the data. It is not assumed that the prelabeled data is representative of the unlabeled dataset, and thus the data labeling service still constructs the validation set. Prelabeled data might have very reliable labels, in which case it can be identified as a gold standard dataset, representing true labels and which can be used to help estimate the quality of the human annotations, and individual worker accuracy.

The main loop starts by running inference with the model on the validation dataset. After that, every object is given a confidence level. For example, for image classification, a confidence level can be the probability that the model predicts for the most confident class. A threshold is found such that for the objects whose model confidence is above the threshold the expected quality of the label provided by the model exceeds a required quality value provided by the user. Then, the inference on the unlabeled data is performed, and the threshold is applied on the resulting inferences. All objects with the confidence larger than the threshold get auto-annotated and put into the labeled dataset. For the rest of the objects, active learning is performed to identify a subset of the objects which potentially benefit the model most. Active learning may be executed in a separate active learning loop that iteratively labels portions of the unlabeled dataset and trains the model to better auto-label the dataset, as described herein. This batch of objects is sent for human annotation. During human annotation, previously-found worker quality parameters are used, and adjusted with the new information from their annotations of the new objects. Human labels for these objects are fed into the labeled dataset. All previously human-labeled objects are then used to train a new version of the supervised model, and the loop repeats until all the data is labeled. Then, the labeled dataset is returned to the user, along with the last model which was trained.

Figure 7:
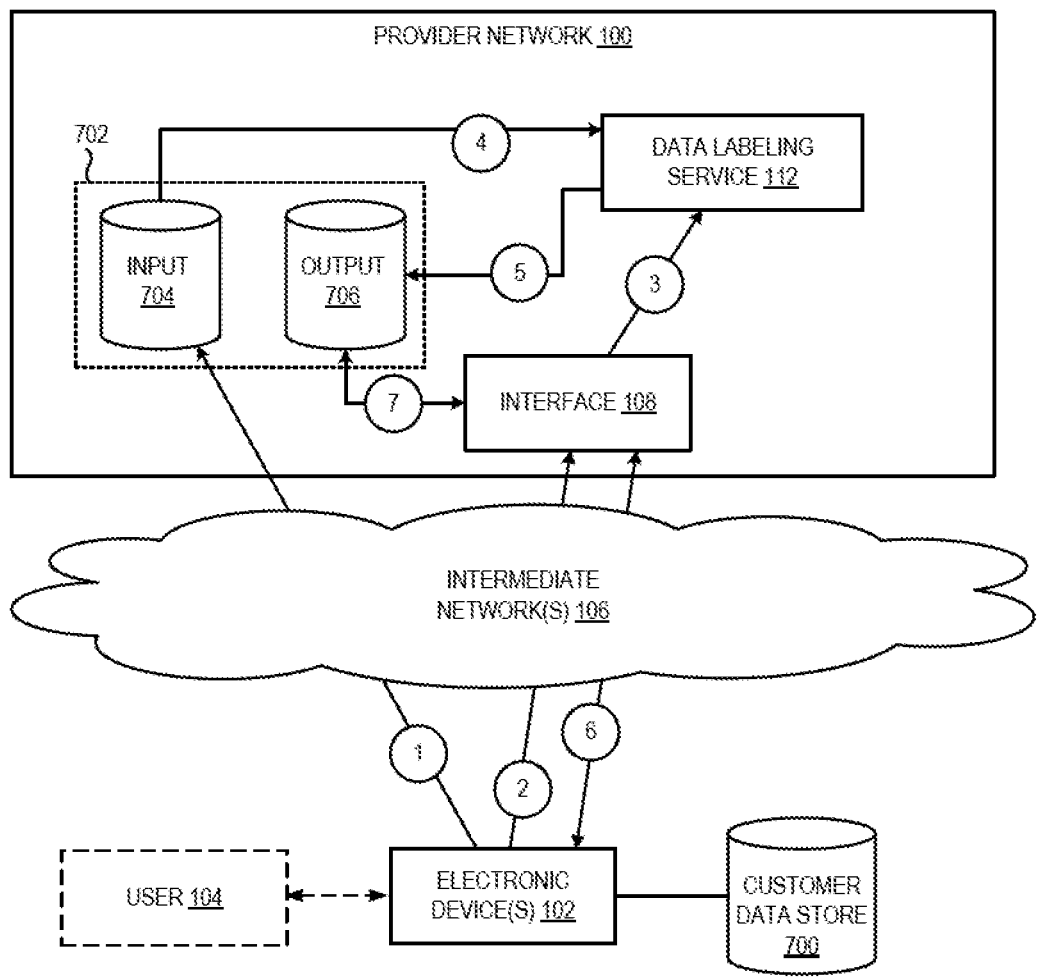
FIG. 7 is a diagram illustrating an environment for providing datasets to an active learning-based data labeling service and receiving outputs of the active learning-based data labeling service according to some embodiments.

FIG. 7 is a diagram illustrating an environment for providing datasets to an active learning-based data labeling service and receiving outputs of the active learning-based data labeling service according to some embodiments. As shown in FIG. 7, a user can maintain their own user data store 700 which includes one or more user datasets. These may include unlabeled or partially labeled datasets to be provided to data labeling service 112. At numeral 1, the user (via one or more computing devices 102) can upload an input dataset to input data store 704. Input data store 704 and output data store 706 may be virtualized data stores 702 provided by a storage service in provider network 100. The storage service may provide object storage, block storage, database storage, or other virtualized storage services. At numeral 2, as discussed above, the user can provide access information and/or credentials for the input dataset in input data store 704 through a user interface 104. This may include providing a URL for input data store 704 and credentials for accessing the data store. In some embodiments, the user may establish permissions to allow the data labeling service 112 to access the input dataset. The user interface 104 can pass the information to data labeling service 112 at numeral 3.

At numeral 4, data labeling service 112 can retrieve the input dataset from the input data store 704 and perform active learning-based labeling, as discussed above with respect to FIG. 1. Data labeling service 112 can perform the above described workflow in nested fashion until the active learning model converges. The resulting labeled dataset and/or the converged model can then be output to output data store 706 at numeral 5. Both input and output data stores 704, 706 may be "owned" or otherwise controlled by the user. Any intermediate state data generated for the input dataset by data labeling service 112 can be destroyed, with no durable copies of the labels or input dataset maintained by the data labeling service 112. Thus, the user's data is labeled and ownership of the dataset and labels is retained by the user. In some embodiments, the user can access the output data store 706 via user interface 104. For example, the user can send a request to view, download, transfer, etc. the labeled dataset in output data store 706 to user interface 104 at numeral 6. The user interface 104 can obtain the requested labeled dataset or portion thereof at numeral 7 and provide the requested labeled dataset to the user. In some embodiments, the user may access the output data store 706 through a separate user interface (e.g., provided by a storage service that is providing the output data store 706, a local file system, or other interface based on the implementation of the output data store).

In some embodiments, the dataset may include a manifest file which describes dataset properties and records. A record may include named attributes, including metadata such as image size, or labels such as "dog" or "cat". Other attributes may include raw data which needs labeling, such as image or sentences in natural language processing (NLP). In some embodiments, a manifest file for a dataset may be generated automatically by extracting metadata from files in the input data store 704 and generating the manifest file based on the metadata. In some embodiments, the output dataset stored in output data store 706 may be an updated version of the input dataset, which has been updated by combining the input dataset with the generated labels as a new dataset.

Figure 8:
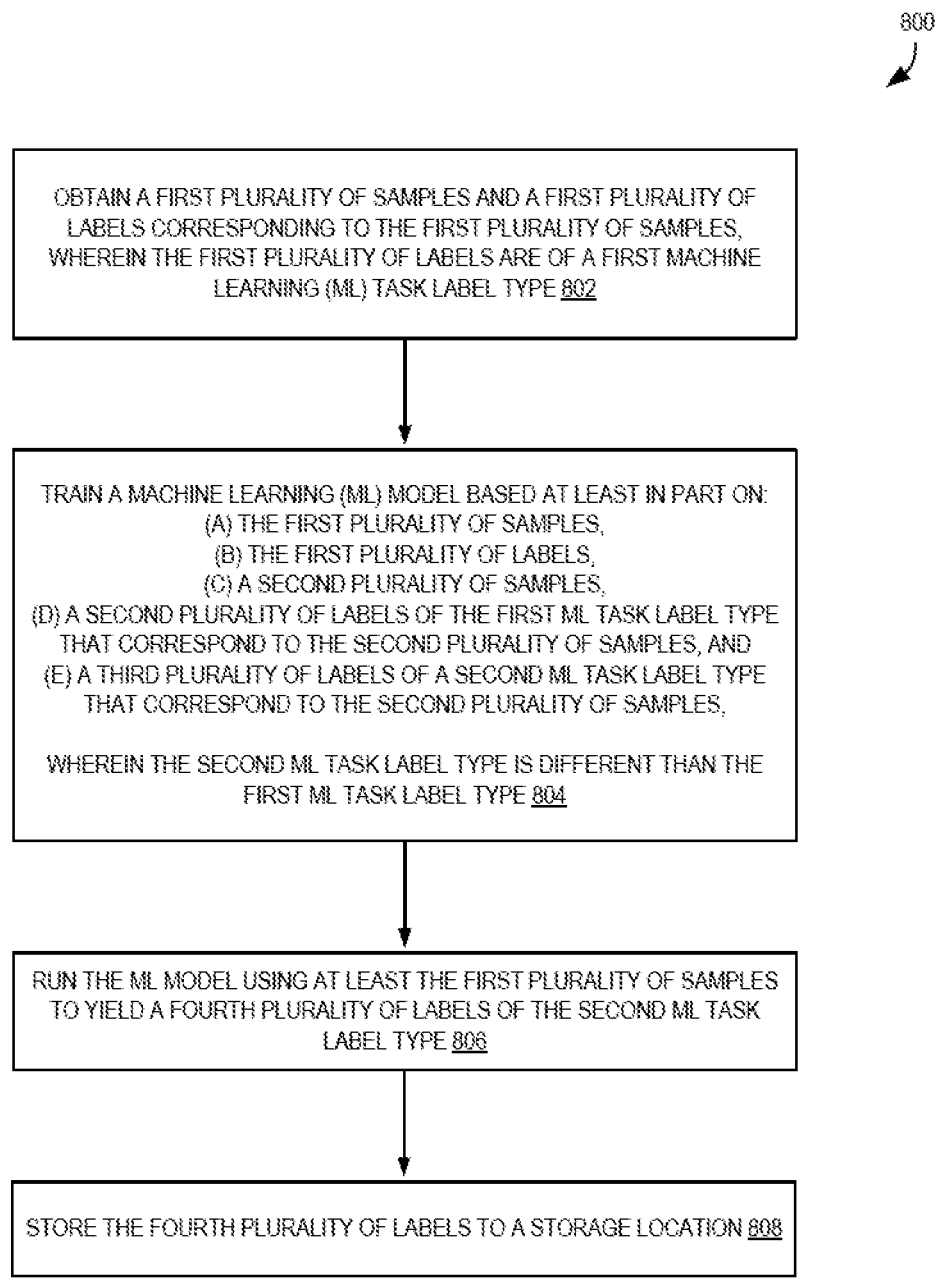
FIG. 8 is a flow diagram illustrating operations of a method for zero-shot transfer of a domain-adapted base network according to some embodiments.

FIG. 8 is a flow diagram illustrating operations 800 of a method for zero-shot transfer of a domain-adapted base network according to some embodiments. Some or all of the operations 800 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 800 are performed by the data labeling service 112 of the other figures.

The operations 800 include, at block 802, obtaining a first plurality of samples and a first plurality of labels corresponding to the first plurality of samples, wherein the first plurality of labels are of a first machine learning (ML) task label type.

The operations 800 further include, at block 804, training a machine learning (ML) model based at least in part on: the first plurality of samples, the first plurality of labels, a second plurality of samples, a second plurality of labels of the first ML task label type that correspond to the second plurality of samples, and a third plurality of labels of a second ML task label type that correspond to the second plurality of samples, wherein the second ML task label type is different than the first ML task label type. In some embodiments, the first ML task label type and the second ML task label type are respectively associated with a first ML task and a different, second ML task, and where each of the first ML task and the second ML task are one of: object detection; scene detection; image classification; or semantic image segmentation.

In some embodiments, the first plurality of samples comprises a plurality of images; the first ML task type is classification, the first ML task label type is a class label, and the first layer includes one or more classifiers; and the second ML task type is object detection, the second ML task label type includes at least one coordinate, and the second layer includes one or more detectors.

In some embodiments, the ML model comprises: a feature extractor; a first layer associated with a first ML task type that utilizes features generated by the feature extractor; and a second layer associated with a second ML task type that utilizes the features generated by the feature extractor.

In some embodiments, block 804 includes: training the first layer based at least in part on use of the first plurality of samples, the second plurality of samples, the first plurality of labels, and the second plurality of labels; and training the second layer based at least in part on use of the second plurality of samples and the third plurality of labels. In some embodiments, training the ML model further comprises: updating weights of the feature extractor based at least in part on outputs from the training of the first layer and the training of the second layer.

The operations 800 further include, at block 806, running the ML model using at least the first plurality of samples to yield a fourth plurality of labels of the second ML task label type.

In some embodiments, block 806 includes, for each of the first plurality of samples: generating a feature via the feature extractor for the sample; and generating a label based at least in part on providing the feature to the second layer.

At block 808, the operations further include storing the fourth plurality of labels to a storage location.

In some embodiments, the operations 800 further include: receiving, at an interface of a provider network, the first plurality of samples; storing, by the provider network, the first plurality of samples to a storage location provided by a storage service within the provider network; and receiving, at the provider network, one or more messages originated by a computing device of a user indicating a request to generate the fourth plurality of labels and identifying the first plurality of samples or the storage location, wherein obtaining the first plurality of samples comprises sending a request to the storage service for the first plurality of samples.

In some embodiments, the operations 800 further include: receiving, at a provider network and originated by a computing device of a user, the second plurality of samples, the second plurality of labels, and the third plurality of labels.

In some embodiments, the operations 800 further include: receiving, at a provider network, one or more messages originated by a computing device of a user indicating a request to determine which types of a plurality of candidate ML task label types the provider network can generate for the first plurality of samples, wherein the ML model comprises a feature extractor and at least three different layers, and wherein the running the ML model further comprises using at least the first plurality of samples to yield a fifth plurality of labels of a third ML task label type.

In some embodiments, a first sample from the first plurality of samples and a second sample from the second plurality of samples represent different entities but share a same corresponding label from the first plurality of labels and the second plurality of labels, respectively.

Figure 9:
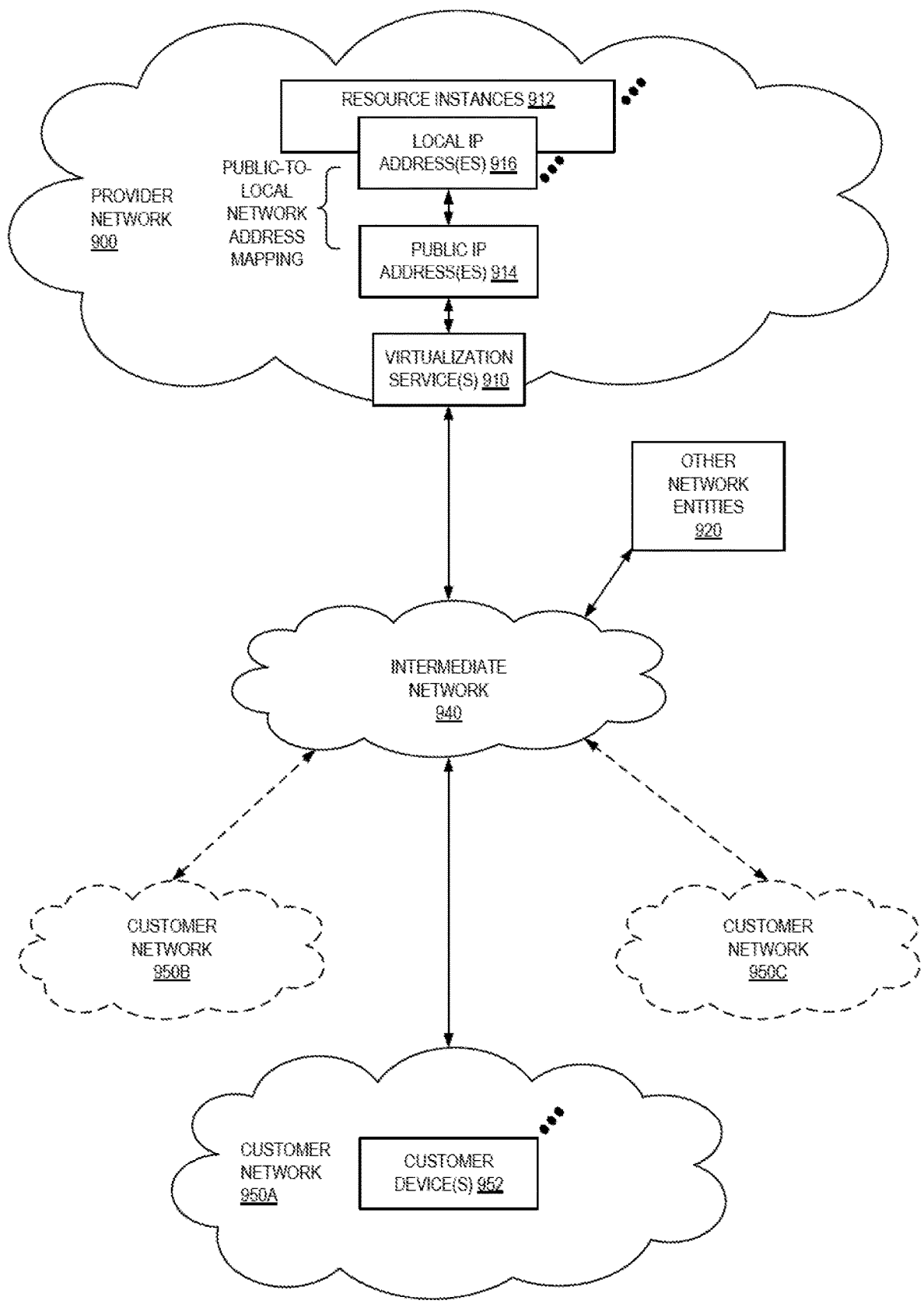
FIG. 9 illustrates an example provider network environment according to some embodiments.

FIG. 9 illustrates an example provider network (or "service provider system") environment according to some embodiments. A provider network 900 may provide resource virtualization to users via one or more virtualization services 910 that allow users to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that users may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
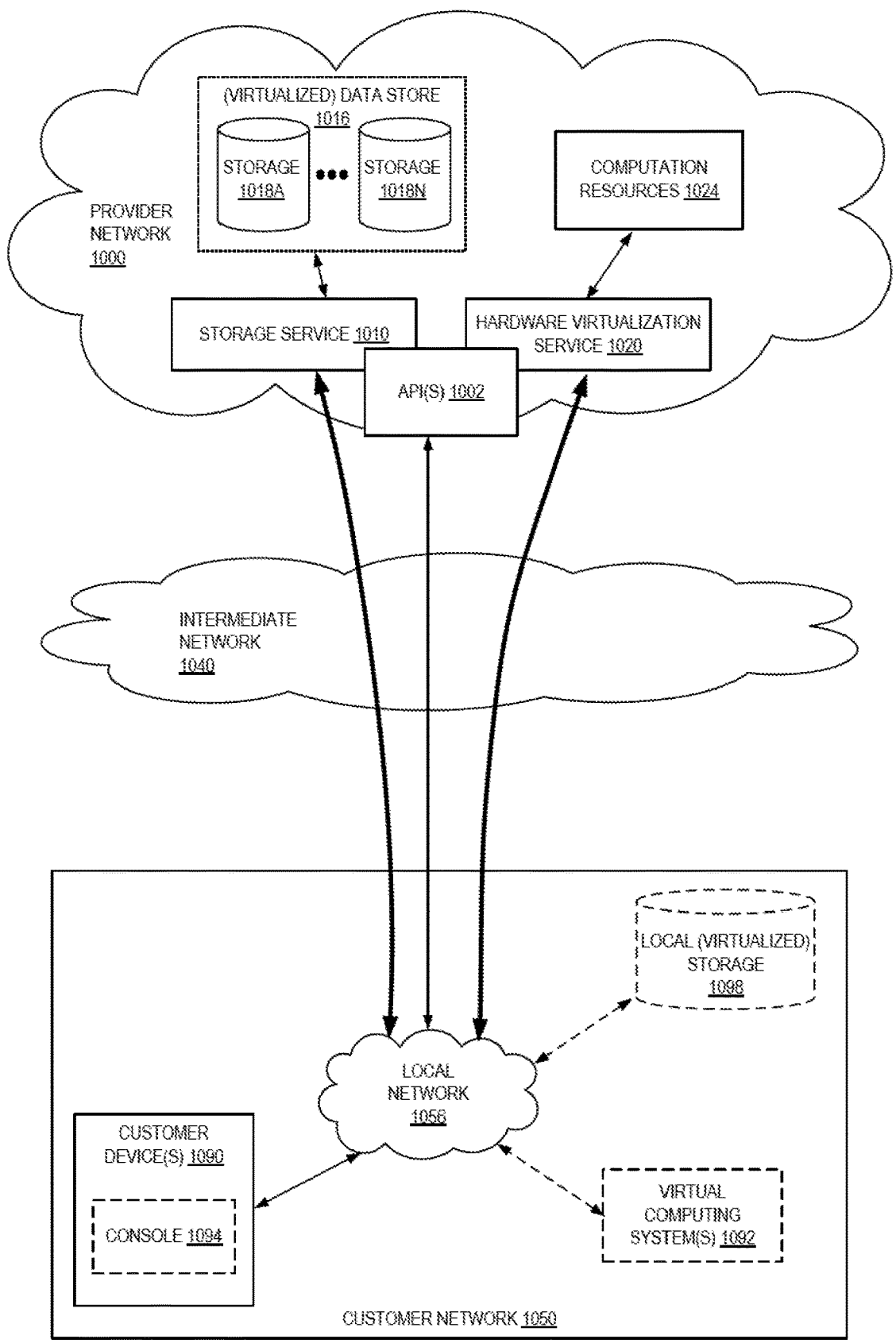
FIG. 10 is a block diagram of an example provider network that provides a storage service and a hardware virtualization service to customers according to some embodiments.

FIG. 10 is a block diagram of an example provider network that provides a storage service and a hardware virtualization service to customers, according to some embodiments. Hardware virtualization service 1020 provides multiple computation resources 1024 (e.g., VMs) to customers. The computation resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the computation resources 1024 to public Internet destinations, and from public Internet sources to the local IP addresses of computation resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some embodiments, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Illustrative Systems

Figure 11:
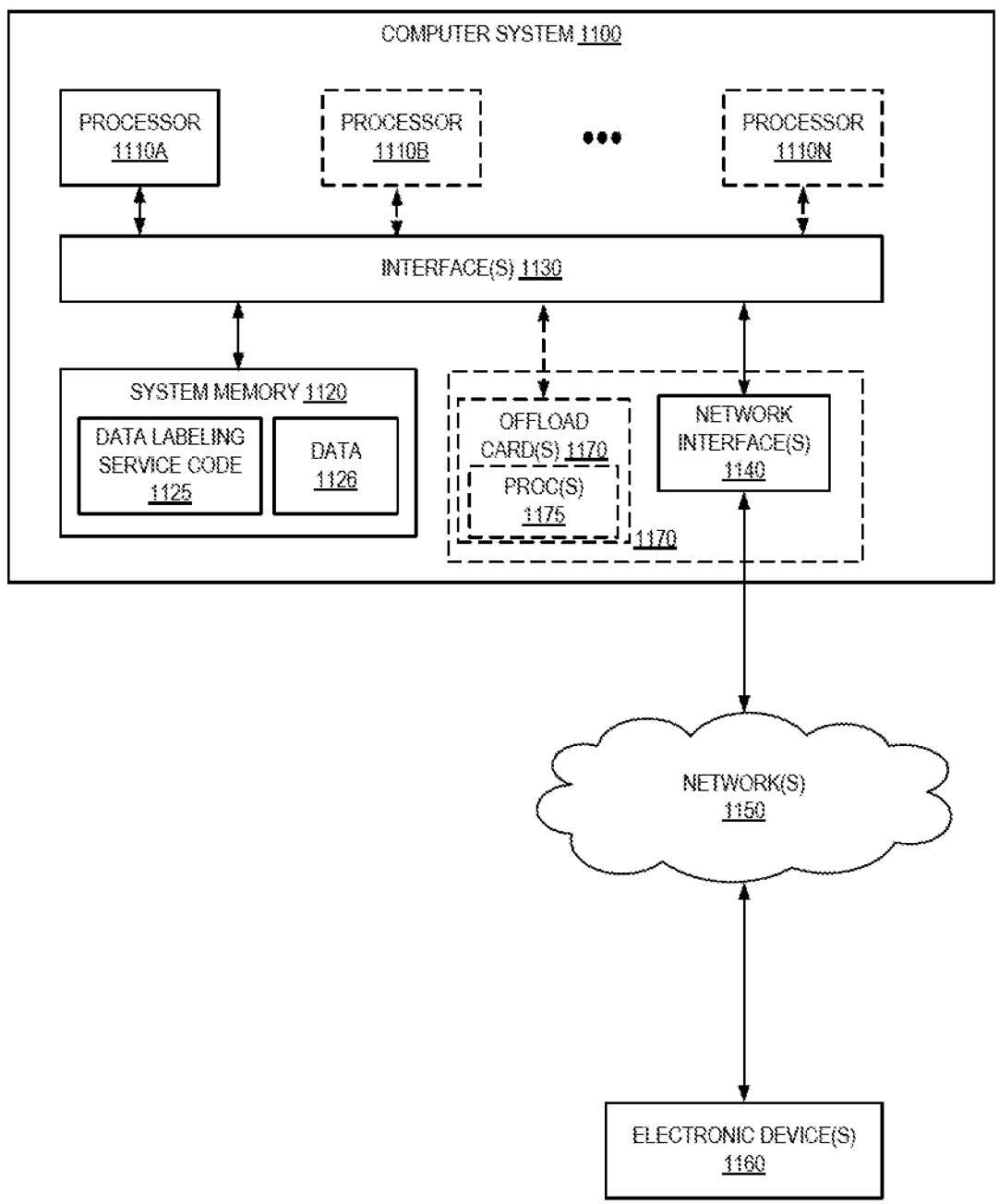
FIG. 11 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as data labeling service code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1018A-1018N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    receiving, at a provider network, a first plurality of images originated by a computing device of a user, wherein the first plurality of images is associated with a first domain;
    receiving, at the provider network, data indicating a first plurality of classification labels corresponding to the first plurality of images but not indicating any object detection labels, wherein classification labels indicate a class to which a respective object belongs, and object detection labels indicate a location of an object within a respective image;
    receiving, at the provider network, a request to generate a first plurality of object detection labels corresponding to the first plurality of images;
    training, by the provider network, a neural network comprising one or more base network layers, one or more classification layers and one or more object detection layers, the training comprising:
        training the one or more classification layers based at least in part on use of the first plurality of images, the first plurality of classification labels, a second plurality of images associated with a second, different domain than the first plurality of images, and a second plurality of classification labels corresponding to the second plurality of images, wherein the first domain comprises a plurality of types of entities that are different from types of entities included in the second domain, and wherein a first entity represented within at least one of the first plurality of images is purposefully assigned a corresponding classification label that is of a same class as the classification label of a second, different type of entity represented within one or more of the second plurality of images,
        training the one or more object detection layers based at least in part on use of the second plurality of images and a second plurality of object detection labels corresponding to the second plurality of images, and
        backpropagating updates to weights of the one or more base network layers based at least in part on the training of the one or more classification layers and the training of the one or more object detection layers;
    running, by the provider network, the trained neural network using at least the first plurality of images to yield the first plurality of object detection labels; and
    storing, by the provider network, the first plurality of object detection labels to a second storage location.

2. A computer-implemented method comprising:
    obtaining via an interface, a first plurality of samples and a first plurality of labels corresponding to the first plurality of samples, wherein the first plurality of samples is associated with a first domain, and wherein the first plurality of labels are of a first machine learning (ML) task label type;

training one or more machine learning (ML) models comprising a feature extractor, a first layer associated with a first ML task, and a second layer associated with a second, different ML task, the first and second layers using features generated by the feature extractor, the training based at least in part on:
 training the first layer based at least in part on use of the first plurality of samples, the first plurality of labels, a second plurality of samples associated with a second, different domain than the first plurality of samples, a second plurality of labels of the first ML task label type that correspond to the second plurality of samples, wherein the first domain comprises a plurality of types of entities that are different from types of entities included in the second domain, and wherein a first entity represented within the first plurality of samples and a second, different type of entity represented within the second plurality of samples are purposefully assigned a same label of the first machine learning task label type,
 training the second layer based at least in part on use of the second plurality of samples and a third plurality of labels of a second ML task label type that correspond to the second plurality of samples, wherein the second ML task label type is different than the first ML task label type, and
 updating weights of the feature extractor based at least in part on outputs from the training of the first layer and the training of the second layer;
running at least one of the one or more trained ML models using at least the first plurality of samples to yield a fourth plurality of labels associated with the first plurality of samples, wherein the fourth plurality of labels is of the second ML task label type; and
storing the fourth plurality of labels to a storage location.

3. The computer-implemented method of claim 2, wherein the first ML task label type and the second ML task label type are respectively associated with the first ML task and the different, second ML task, wherein each of the first ML task and the second ML task is one of:
 object detection;
 scene detection;
 image classification; or
 semantic image segmentation.

4. The computer-implemented method of claim 2, wherein running the at least one ML model comprises, for each of the first plurality of samples:
 generating a feature via the feature extractor for the sample; and
 generating a label based at least in part on providing the feature to the second layer.

5. The computer-implemented method of claim 2, further comprising:
 receiving, at an interface of a provider network, the first plurality of samples;
 storing, by the provider network, the first plurality of samples to a storage location provided by a storage service within the provider network; and
 receiving, at the provider network, one or more messages originated by a computing device of a user indicating a request to generate the fourth plurality of labels and identifying the first plurality of samples or the storage location,
 wherein obtaining the first plurality of samples comprises sending a request to the storage service for the first plurality of samples.

6. The computer-implemented method of claim 2, further comprising receiving, at a provider network and originated by a computing device of a user:
 the second plurality of samples;
 the second plurality of labels;
 the third plurality of labels; and
 an identifier, a definition, or code for at least one of:
  the feature extractor for the one or more ML models;
  a loss function for use in the training of the one or more ML models;
  the first layer for the one or more ML models; or
  the second layer for the one or more ML models.

7. The computer-implemented method of claim 2, further comprising:
 receiving, at a provider network, one or more messages originated by a computing device of a user indicating a request to determine which types of a plurality of candidate ML task label types the provider network can generate for the first plurality of samples,
 wherein the one or more ML models comprise the feature extractor and at least three different layers, and
 wherein the running the at least one ML model further comprises using at least the first plurality of samples to yield a fifth plurality of labels of a third ML task label type.

8. The computer-implemented method of claim 2, further comprising:
 deploying the trained one or more ML models within a provider network, the deploying including associating an endpoint with the deployed one or more ML models;
 receiving, at the endpoint, an inference request originated by a client;
 providing the inference request to the deployed one or more ML models to yield an inference result; and
 transmitting the inference result to the client.

9. The computer-implemented method of claim 2, wherein:
 the first plurality of samples comprises a first plurality of images;
 the second plurality of samples comprises a second plurality of images;
 the first ML task type is classification, the first ML task label type is a class label, and the first layer includes one or more classifiers;
 the second ML task type is object detection, the second ML task label type includes at least one coordinate, and the second layer includes one or more detectors; and
 the first entity represented within the first plurality of images and the second, different entity represented within the second plurality of images are assigned a same class label.

10. A system comprising:
 a first one or more electronic devices that implement a storage service of a provider network; and
 a second one or more electronic devices that implement a data labeling service of the provider network, the data labeling service including instructions that upon execution by the second one or more electronic devices cause the data labeling service to:
  obtain, from the storage service, a first plurality of samples and a first plurality of labels corresponding to the first plurality of samples, wherein the first plurality of samples is associated with a first domain, and wherein the first plurality of labels are of a first machine learning (ML) task label type;
  train one or more machine learning (ML) models comprising a feature extractor, a first layer associated with a first ML task, and a second layer associated with a second, different ML task, the first and second layers using features generated by the feature extractor, the training based at least in part on:

training the first layer based at least in part on the use of the first plurality of samples, the first plurality of labels, a second plurality of samples associated with a second, different domain than the first plurality of samples, and a second plurality of labels of the first ML task label type that correspond to the second plurality of samples, wherein the first domain comprises a plurality of types of entities that are different from types of entities included in the second domain, and wherein a first entity represented within the first plurality of samples and a second, different type of entity represented within the second plurality of samples are purposefully assigned a same label of the first machine learning task label type, training the second layer based at least in part on use of the second plurality of samples and a third plurality of labels of a second ML task label type that correspond to the second plurality of samples, wherein the second ML task label type is different than the first ML task label type, and updating weights of the feature extractor based at least in part on outputs from the training of the first layer and the training of the second layer;

run at least one of the one or more trained ML models using at least the first plurality of samples to yield a fourth plurality of labels associated with the first plurality of samples, wherein the fourth plurality of labels is of the second ML task label type; and send the fourth plurality of labels to the storage service to be stored at a storage location.

11. The system of claim 10, wherein the first ML task label type and the second ML task label type are respectively associated with the first ML task and the different, second ML task, wherein each of the first ML task and the second ML task is one of:
object detection;
scene detection;
image classification; or
semantic image segmentation.

12. The system of claim 10, wherein to run the at least one ML model, the data labeling service is to, for each of the first plurality of samples:
generate a feature via the feature extractor for the sample; and
generate a label based at least in part on providing the feature to the second layer.

13. The computer-implemented method of claim 1, wherein running the trained neural network comprises, for each of the first plurality of images:
generating a feature for the image via the one or more base network layers; and
generating the corresponding object detection label based at least in part on providing the feature to the object detection layer.

14. The computer-implemented method of claim 1, further comprising:
receiving, at the provider network, one or more messages originated by the computing device of a user indicating a request to determine which types of a plurality of candidate ML task label types the provider network can generate for the first plurality of images, wherein the neural network comprises the one or more base network layers and at least three different types of task layers including the classification and object detection layers and a third type of task layer, and wherein the running the trained neural network further comprises using at least the first plurality of images to yield a plurality of labels of a third ML task label type that is associated with a task other than classification or object detection.

15. The system of claim 10, wherein the data labeling service includes further instructions that upon execution by the second one or more electronic devices cause the data labeling service to:
receive, at an interface of a provider network, the first plurality of samples;
store, by the provider network, the first plurality of samples to a storage location provided by a storage service within the provider network; and
receive, at the provider network, one or more messages originated by a computing device of a user indicating a request to generate the fourth plurality of labels and identifying the first plurality of samples or the storage location,
wherein obtaining the first plurality of samples comprises sending a request to the storage service for the first plurality of samples.

16. The system of claim 10, wherein the data labeling service includes further instructions that upon execution by the second one or more electronic devices cause the data labeling service to receive, at a provider network from a computing device of a user:
the second plurality of samples;
the second plurality of labels;
the third plurality of labels; and
an identifier, a definition, or code for at least one of:
the feature extractor for the one or more ML models;
a loss function for use in the training of the one or more ML models;
the first layer for the one or more ML models; or
the second layer for the one or more ML models.

17. The system of claim 10, wherein the data labeling service includes further instructions that upon execution by the second one or more electronic devices cause the data labeling service to:
receive, at a provider network, one or more messages originated by a computing device of a user indicating a request to determine which types of a plurality of candidate ML task label types the provider network can generate for the first plurality of samples,
wherein the one or more ML models comprise the feature extractor and at least three different layers, and
wherein the running the at least one ML model further comprises using at least the first plurality of samples to yield a fifth plurality of labels of a third ML task label type that is different from the first or second ML task types.

18. The system of claim 10, wherein the data labeling service includes further instructions that upon execution by the second one or more electronic devices cause the data labeling service to:
deploy the trained one or more ML models within the provider network, the deploying including associating an endpoint with the deployed one or more ML models;
receive, at the endpoint, an inference request originated by a client;

provide the inference request to the deployed one or more ML models to yield an inference result; and transmit the inference result to the client.

19. The system of claim 10, wherein:

the first plurality of samples comprises a first plurality of images;

the second plurality of samples comprises a second plurality of images;

the first ML task type is classification, the first ML task label type is a class label, and the first layer includes one or more classifiers;

the second ML task type is object detection, the second ML task label type includes at least one coordinate, and the second layer includes one or more detectors; and the first entity represented within the first plurality of images and the second, different entity represented within the second plurality of images are assigned a same class label.

* * * * *